United States Patent [19]

Merkel

[11] Patent Number: 4,467,182

[45] Date of Patent: Aug. 21, 1984

[54] CONTROL CIRCUIT

[75] Inventor: Stephen L. Merkel, Bay Village, Ohio

[73] Assignee: Nordson Corporation, Amherst, Ohio

[21] Appl. No.: 301,732

[22] Filed: Sep. 16, 1981

[51] Int. Cl.³ .............................................. H05B 1/02
[52] U.S. Cl. .................................. 219/497; 219/501; 219/494; 323/245
[58] Field of Search ............... 219/497, 499, 501, 494, 219/506, 505; 323/235, 236, 242, 245; 307/117, 252 UA

[56] References Cited

U.S. PATENT DOCUMENTS

| | | |
|---|---|---|
| 3,330,970 | 7/1967 | Wennerberg et al. |
| 3,584,291 | 6/1971 | Budniak et al. ...................... 323/236 |
| 3,784,843 | 1/1974 | Gustus .................................. 219/497 |
| 3,842,243 | 10/1974 | Gregory . |
| 3,906,391 | 9/1975 | Murdock . |
| 3,943,331 | 3/1976 | Meijer .................................. 219/497 |
| 3,946,200 | 3/1976 | Juodikis .............................. 219/499 |
| 4,148,220 | 4/1979 | Spofford . |
| 4,179,745 | 12/1979 | Wuertele . |
| 4,205,327 | 5/1980 | Dahlke . |
| 4,241,303 | 12/1980 | Thompson . |
| 4,314,143 | 2/1982 | Bilstad ................................. 219/506 |
| 4,317,985 | 3/1982 | Wilson ................................. 219/497 |

Primary Examiner—M. H. Paschall
Attorney, Agent, or Firm—Wood, Herron & Evans

[57] ABSTRACT

A system for controlling the temperature at a location which is heated by a heater. The heater is intermittently energized by a source of electrical power in response to control signals from a temperature control circuit. The temperature control circuit includes a comparator-amplifier having one input coupled to a sensed temperature signal. The other input to the comparator-amplifier is a set point temperature level. The sensed temperature signal is produced by a bridge circuit including a temperature sensor at the location which is being heated. The comparator-amplifier includes a feedback network to establish a pulse output of a certain frequency when the two inputs are equal. In order to expand the operating band of the comparator-amplifier, an a-c voltage is introduced superimposed on the set point input. Over the operating band the output pulses from the comparator-amplifier are inversely proportional to the sensed temperature signal, and these pulses are used to control the application of electrical power to the heater.

16 Claims, 3 Drawing Figures

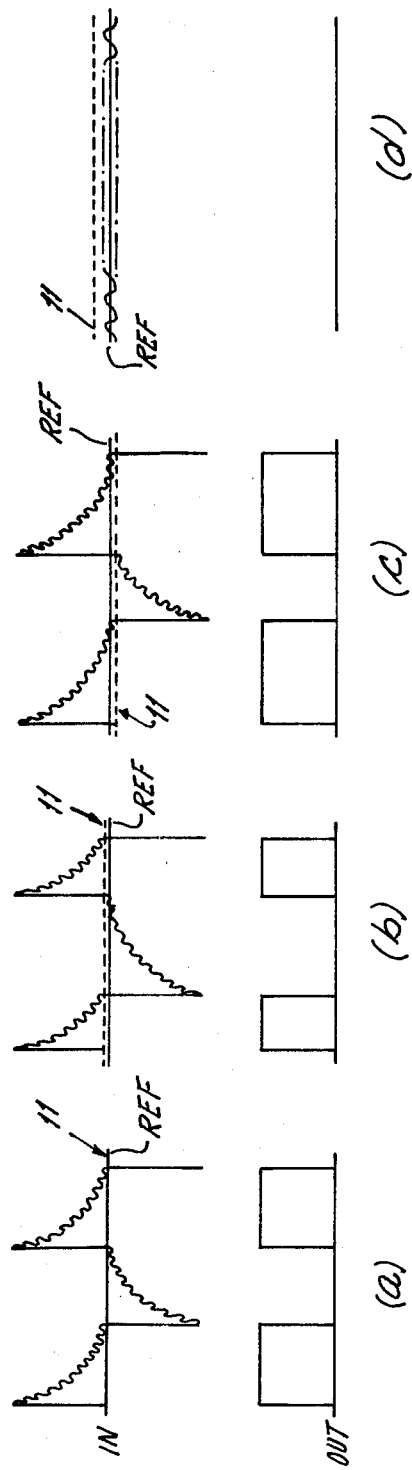
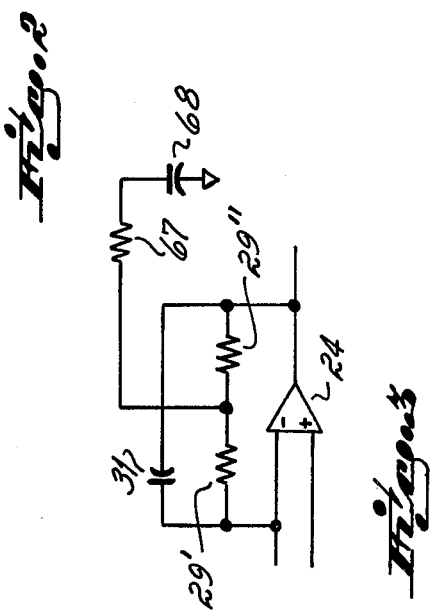

CONTROL CIRCUIT

DESCRIPTION OF THE INVENTION

This invention relates generally to systems for controlling a parameter such as temperature to conform to a set point, and more particularly concerns such systems in which the means for controlling the parameter is a proportional control over a certain band of values.

In many systems a certain physical parameter is measured in a particular location or region and then controlled so that the measured value conforms to a set point value. Such a system is a closed loop system since the parameter is controlled in response to the conditions at the particular region or location. One such closed loop system, for example, is a fluid tank wherein the fluid in the tank is maintained at a selected set point pressure. A pressure transducer senses the pressure in the tank and a controller compares the measured pressure with a set point pressure to control the activation of a pump to maintain the tank pressure.

Another controlled parameter in systems of this type is temperature. For example, the temperature in a freezer compartment is maintained by the controlled activation of a compressor and pump for the circulation of refrigerant through cooling coils in the freezer compartment. In this case, a controller compares the temperature from a temperature sensor in the compartment to a set point temperature in order to control the operation of the compressor and pump.

Another such system, which shall be discussed below in connection with a specific embodiment of the present invention, is a heater control system. In the described system, a hose carrying a hot melt adhesive is heated by the controlled flow of current through a resistance wire heater which is positioned around the hose.

The application of power to the heater is controlled by turning on a power switch such as a triac in series with the heater and a source of electrical power. The temperature of the hose is measured by a temperature sensitive resistance which is placed in the vicinity of the heater and the hose. A bridge circuit, having the temperature sensitive resistance as an element thereof, produces a sensed temperature signal at an output, and this sensed temperature signal is compared to a set point signal to determine whether or not to turn on the triac.

One method of controlling the triac in such a system is to turn on the triac whenever the sensed temperature is lower than the set point temperature and to turn off the triac whenever the sensed temperature is greater than the set point temperature. Such an on-off control has a tendency for the actual temperature to overshoot the set point temperature. The sensed temperature in this case continues to rise after the triac is turned off.

Because of the time it takes for heat from the heater to reach the temperature sensor, the sensed temperature can still be rising even though the heater has been turned off, and the temperature overshoots. Likewise, as temperature falls below the set point, the sensed temperature can continue to fall even though full power is being applied to the heater.

In response to this problem of overshoot, control circuits for energizing heaters have been designed which provide a proportional band of control for the heater. This means that over a particular band of temperatures, the heater is energized a certain proportion of the time and de-energized for a certain proportion of the time. For example, when the sensed temperature equals the set point temperature, the heater may be on 50% of the time. The proportional band may then be plus or minus three degrees from the set point temperature, for example. In the case of a heated hot melt adhesive hose, as the hose is heated and the sensed temperature rises to within three degrees of the set point, the hose heater is fully energized. When the sensed hose temperature reaches three degrees below the set point, the proportional control begins to gradually decrease the amount of time that the heater is energized. Thus, the heater is turned on at first, as the proportional band is entered, 95% of the time, then 90% of the time, down to 50% of the time when the sensed temperature equals the set point temperature. The on-time of the heater, or its duty cycle, decreases subsequently if the sensed temperature rises beyond the set point. The duty cycle decreases to 40%, then 30%, and so on until the heater is completely turned off if the sensed temperature exceeds the set point temperature by three degrees or more.

Control circuits for effecting such proportional band control generally include a comparator stage for comparing the instantaneous value of the sensed temperature signal to a periodically applied ramp signal. In the example just discussed, the midpoint of the ramp corresponds to the set point temperature and the lower and upper ends of the ramp correspond to the lower and upper temperatures of the proportional band.

The generation of such a ramp signal includes a significant amount of further circuitry in addition to the comparator stage, usually including an amplifier or other active device. This in turn adds significant expense to the control circuit. As a consequence, it is a general objective of the present invention to provide a proportional band controller for systems of the foregoing type which is less expensive and in general, requires fewer components than those heretofore used.

In carrying out the invention, in systems of the foregoing type, a proportional band controller is provided which includes a comparator circuit which has a first input coupled to a sensed parameter signal and a second input coupled to a reference parameter signal and which has a feedback circuit coupled between the output and one of the inputs. The comparator circuit, with feedback, is operable to produce a pulse output based upon a comparison of the comparator inputs, and it includes means for coupling an a-c voltage to one of the inputs. The level of the a-c voltage sets the proportional band for the comparator circuit, and within the proportional band the comparator output is a series of pulses whose duration is related to the level of the sensed parameter relative to the set point parameter.

It is a subsidiary object of the invention to provide an alarm indication network which is responsive to failures in the control system. This objective is met by providing means for detecting failures in the production of the sensed parameter signal and failures in the controller circuit to prevent the controller from affecting the controlled parameter during such failure conditions.

Other objects and advantages of the invention will become apparent upon reading the following detailed description and upon reference to the drawings, in which:

FIG. 2 is a series of waveforms taken at different points in the control circuit of FIG. 1 illustrating different control circuit conditions; and FIG. 3 is a circuit diagram of an alternative feedback configuration for the sensed temperature amplifier of FIG. 1.

Figure 1:
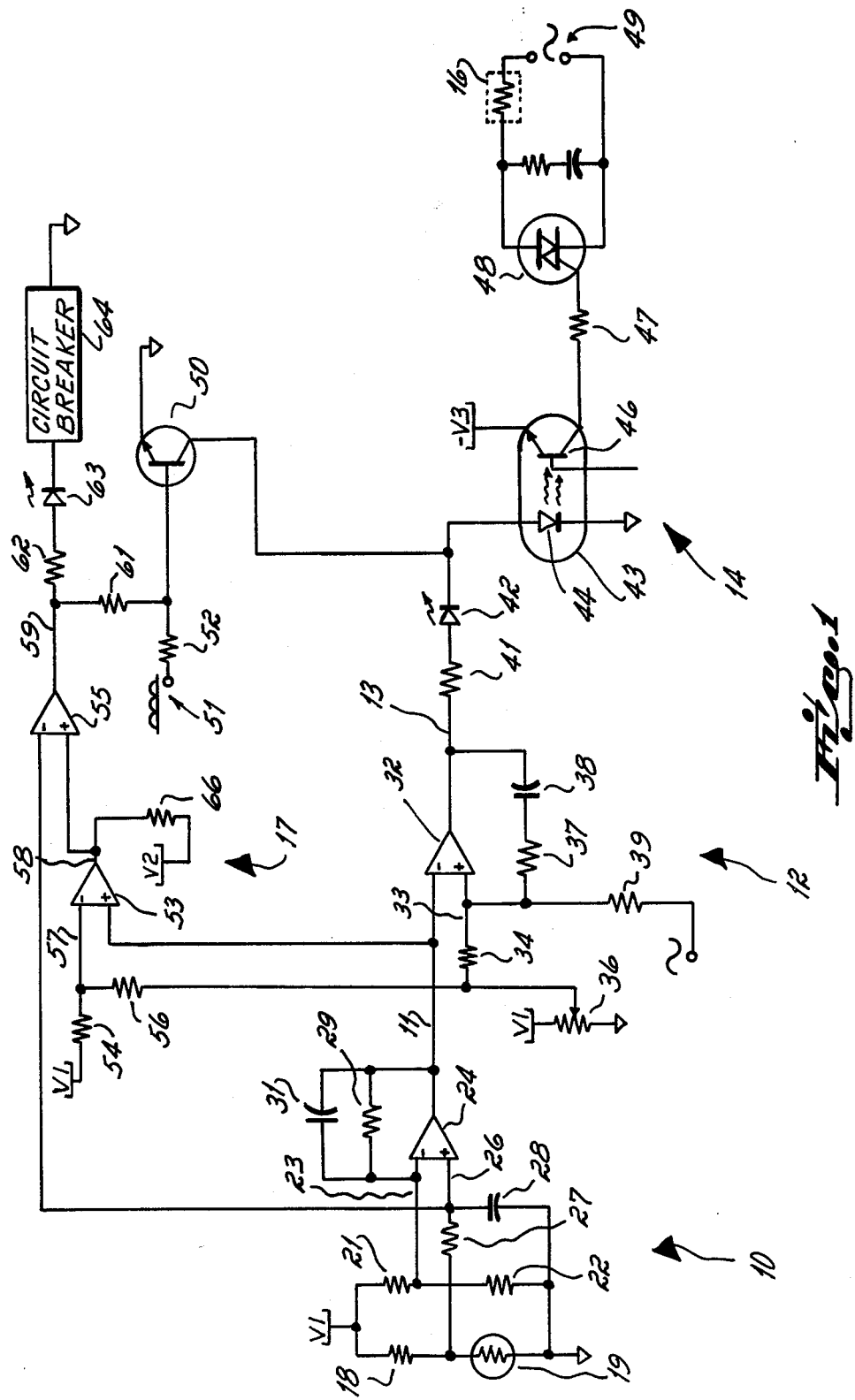
FIG. 1 is a schematic diagram of a temperature control system in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention, as defined by the appended claims.

Turning now to the figures, FIG. 1 illustrates a system for controlling the temperature at a particular location such as a hose for carrying hot melt adhesive. The temperature control system includes a first portion 10 which produces a sensed temperature signal at an output 11, and a temperature control circuit 12 which receives the sensed temperature signal at an input and produces a heater control signal at an output 13. The temperature control system further includes an output portion 14 which receives the control signal at an input and is responsive thereto to effect the application of electrical power to a resistive heating element 16. An alarm and protection circuit 17 interacts with the other portions of the temperature control system to protect against over-temperatures which may result from component failures.

In the sensed temperature signal circuit 10, a first leg of a bridge is made up of a resistor 18 connected in series with a temperature sensor 19. Connected in parallel with the first leg is a second leg made up of a resistor 21 connected in series with a resistor 22. This network forms a bridge circuit coupled between a first d-c supply voltage V1 and circuit common. A reference voltage value is produced at the junction between the resistor 21 and the resistor 22 which is connected on an input line 23 to the inverting input of an amplifier 24. The junction of the resistor 18 with the temperature sensor 19 is coupled to the non-inverting input 26 of the amplifier 24 through a resistor 27. A capacitor 28 is connected between the input 26 and common. A feedback resistor 29 is connected between the output 11 of the amplifier 24 and the inverting input 23. A capacitor 31 is connected in parallel with the resistor 29.

In the illustrated bridge circuit, the input 23 to the amplifier is a reference value and the input 26 to the amplifier is a voltage signal dependent upon the resistance of the temperature sensor 19. The temperature sensor 19 is a nickel wire temperature sensor having a positive temperature coefficient. As the temperature of the sensor 19 increases, its resistance increases, and hence the voltage input 26 increases. The components of the circuit 10 are selected so that the output 11 of the amplifier 24 is a voltage whose value increases linearly with temperature over the temperature range of interest. The primary consideration in effecting this linearity is the selection of the resistor 18 in view of the resistance versus temperature characteristics of the sensor 19.

In one particular circuit, the nickel wire sensor had a resistance-temperature characteristic specified as 191 ohms at 90° C., 259 ohms at 160° C., and 327 ohms at 220° C. For such a sensor, the resistance 18 in series with the sensor 19 in the bridge circuit was 576 ohms.

The gain of the amplifier 24 is established by the feedback resistance 29 to obtain the desired voltage range over the range of possible sensor temperatures. The resistor 27 and the capacitor 28 serve to block high frequency noise from the amplifier 24. The feedback capacitor 31 serves to further eliminate high frequency noise.

The particular circuit 10 of the temperature control system is not critical and could be replaced by other circuits for generating sensed temperature signals. The desired output of the circuit 10 is a sensed temperature signal which is proportional to the temperature at the sensor 19 and which is as linear as possible over the range of temperatures of interest, particularly those within the proportional band.

The sensed temperature signal 11 is connected to the inverting input of an amplifier 32 which is configured as a comparator in the temperature control circuit 12. The non-inverting input 33 of the comparator 32 is coupled through a resistor 34 from the wiper arm of a potentiometer 36, which serves to provide a reference temperature level to the comparator. The potentiometer 36 is coupled between the positive supply voltage V1 and common. The comparator 32 thus compares the sensed temperature signal at its input 11 with a reference temperature level at its input 33.

A feedback network consisting of a resistor 37 in series with a capacitor 38 is connected from the output 13 of the comparator 32 to its non-inverting input 33. As thus far described, the comparator 32 functions to produce a logic high at its output 13 when the reference temperature exceeds the sensed temperature and a logic low when the sensed temperature exceeds the reference temperature. When the output 13 is high it is at the positive comparator supply voltage, and when the output is low it is at common. Also, as thus far described, if the two inputs to the comparator 32 are substantially identical, the output 13 is a series of pulses at a frequency established by the feedback network of the feedback resistor 37 and capacitor 38, as well as the resistor 34 and the portion of the potentiometer 36 between the wiper arm and the common. When the inputs of the comparator 32 are not substantially equal, no pulses are produced.

In accordance with the invention, in order to introduce a proportional control band of temperatures to the control circuit 12, an a-c voltage is introduced through a resistor 39 to the non-inverting input 33 of the comparator. The introduction of the a-c voltage to the input 33 adds a voltage swing to the reference temperature value so that the comparator 32 is triggered over a range of differences in voltage between the sensed temperature signal and the reference temperature level that is established by the potentiometer setting. In addition, the output 13 of the comparator contains pulses with durations inversely proportional to the sensed temperature signal level at the comparator input 11.

The operation of the comparator 32 will be better understood with reference to the waveforms illustrated in FIG. 2. In each of FIGS. 2(a) through (d), the upper waveform is the input 33 to the comparator 32 at a different sensed temperature, and the lower waveform is the corresponding comparator output 13. In FIG. 2, each dashed line 11 represents a sensed temperature signal level. With reference to FIG. 2(a), beginning at a point when the comparator output has just gone high, the comparator input 33 becomes suddenly more positive. This is because a portion of the output pulse is coupled back to the non-inverting input through the feedback network. The reference level, indicated REF, for the input waveform is the d-c reference temperature value established by the setting of the potentiometer 36. As the capacitor 38 charges, the input voltage falls toward the reference value, with the a-c input voltage superimposed thereon. In FIG. 2(a), the sensed temperature signal level 11 is substantially the same as the reference temperature level REF, and as soon as one of the downward excursions of the input voltage caused by the superimposed a-c ripple reaches this value, the comparator 32 turns off and its output goes low. This marks the termination of the pulse at the comparator output.

The drop in the output of the comparator is coupled by the feedback network to the non-inverting input 33 of the comparator, which produces a voltage drop at the input to a level below the reference level. As the capacitor discharges, the input voltage ripples up toward the reference value. When an upward excursion of the ripple voltage causes the input 33 to equal the sensed temperature level 11, the comparator output goes high, initiating another pulse. In the illustrated circuit, the on-time, or duty cycle, of the output pulses of the comparator 32 is 50% when the reference level and sensed temperature level are equal as shown in FIG. 2(a).

FIG. 2(b) illustrates a case in which the sensed temperature exceeds the reference temperature. As illustrated, just after the initiation of an output pulse, the input voltage ripples downwardly until contacting the sensed temperature level input 11. At this time, the comparator turns off ending the output pulse and the input 33 drops relative to the reference level. The input 33 then ripples upwardly toward the reference level until an upward excursion of the input voltage past the reference level due to the a-c ripple equals the sensed temperature level 11, initiating another pulse at the output of the comparator. As shown in FIG. 2(b), when the sensed temperature is above the reference temperature, the comparator output pulses are of shorter duration, and the duty cycle is less than 50%. In FIG. 2(c) the sensed temperature is lower than the reference temperature. Once again, pulses begin and end when the reference temperature signal, with the superimposed ripple, equals the sensed temperature. In this case the pulse durations are longer, and the duty cycle is greater than 50%. Thus, the desired inverse relationship between pulse width and temperature is obtained. If the heater is turned on during the on-times of the pulses, the heater will be on less when the sensed temperature exceeds the reference temperature and more when the sensed temperature is lower than the reference temperature.

FIG. 2(d) illustrates a case in which the sensed temperature at the input 11 has risen to a level at which it exceeds the value of the reference level by more than the amount of the ripple introduced onto the comparator input 33. In this case the sensor temperature is above the proportional band, so that the heater is not energized. Similarly, in the situation where the sensed temperature is below the proportional band, the amplifier output 13 is not pulsed, but is on continuously. The amplitude of the a-c ripple coupled to the comparator input 33 determines the width of the proportional band.

Returning now to FIG. 1, the output of the comparator 32, which is a pulse signal of variable pulse width when operating in the proportional band, is coupled through a resistor 41 and a light emitting diode 42 to an opto-isolator 43. When the output of the comparator is high, the light emitting diode 42 and a light emitting diode 44 in the opto-isolator 43 are energized. In the proportional band, the pulsed output of the comparator 32 causes the light emitting diodes 42 and 44 to blink on and off at the pulse rate.

Turning on the light emitting diode 44 in the opto-isolator 43 turns on a phototransistor 46 in the opto-isolator. Turning on the phototransistor 46 couples a negative supply voltage V3 through a resistor 47 to the gate of a triac 48, turning on the triac. Turning on the triac 48 couples a-c power through the heating element 16 to heat the hot melt adhesive hose. The temperature of the hose as it is heated by the heating element 16 is sensed by the temperature sensor 19 to produce the sensed temperature 11 coupled to the input of the comparator 32, closing the loop in the temperature control system.

When the output of the comparator 32 is high, the triac 48 is turned on and the heater 16 is energized. In the proportional band, the width of the output pulses from the comparator 32 determines the on-time, or duty cycle, of the heater 16 by controlling the on-time of the triac 48. Therefore, the output of the comparator 32 is an intermittent control signal for the heater which is proportional to the difference between the sensed temperature and the set point temperature.

In order to prevent the turning on of the triac 48 other than in the vicinity of zero crossings of the a-c supply voltage 49, a transistor 50 shunts the anode of the photodiode 44 to common except in the vicinity of the zero crossing by the a-c supply voltage. This is accomplished by applying a full wave rectified, unfiltered voltage 51, which is derived from the a-c supply 49, through a resistor 52 to the base of the transistor 50. The collector of the transistor 50 is connected to the anode of the photodiode 44, and the emitter of the transistor is connected to common. The transistor 50 is operable to shunt the anode of the photodiode to common when the voltage 51 is above a certain preselected threshold value. The low voltage points on the input 51 of course correspond to the zero crossings of the a-c voltage 49. Therefore, if the leading edge of a pulse output from the comparator 32 occurs prior to a zero crossing of the supply voltage 49, the pulse is shunted through the transistor 50 rather than through the photodiode 44. At the time of the next zero crossing, during the time that the transistor 50 is turned off, the photodiode 44 is energized, and the triac 48 is gated on by turning on the phototransistor 46.

In response to failure conditions, the alarm and shutdown circuit 17 is operable to activate the transistor 50 to shunt the photodiode 44 and also to operate a circuit breaker to disconnect the a-c power 49 from the heater.

The circuit 17 includes a first comparator 53 whose output is connected to the non-inverting input of a comparator 55. The inverting input of the comparator 53 is connected at the junction between two resistors 54 and 56 connected in series between the first supply voltage V1 and the wiper arm of the potentiometer 36. This places the inverting input of the comparator 53 at a level representative of a higher temperature than the reference temperature level set by the potentiometer 36. For example, if the resistors 54 and 56 are equal, the input to the comparator is representative of a temperature half way between the set point temperature and the maximum set point temperature. The non-inverting input of the comparator 53 is connected to the sensed temperature signal line 11.

Since the high temperature reference level input 57 to the comparator 53 is substantially higher than the reference level, during normal system operation it is also considerably higher than the sensed temperature level at the non-inverting input to the comparator. Therefore, the output 58 of the comparator 53 is normally low. If the output 58 of the comparator 53 goes high, indicating a high temperature condition, the output 59 of the comparator 55 goes high. The comparator output 59 is coupled through a resistor 61 to the base of the transistor 50. Therefore, if the output 59 goes high, the transistor 50 is turned on, shunting the photodiode 44 in the opto-isolator and thus deenergizing the heater 16. The output 59 of the comparator 55 is also coupled through a resistor 62 and a photodiode 63 to a time delay circuit breaker 64. Again, if the output 59 goes high, the photodiode 63 is energized serving as an alarm indication of an over-temperature condition. In addition, after a suitable time delay, the circuit breaker 64 removes power from the system by disconnecting the a-c supply 49.

The comparator 55 serves also to detect and react to a failure of the sensor 19. The output of the comparator 53 is responsive to a current supply from a voltage source V2 through a resistor 66 to maintain its output 58 at a small non-zero voltage, generally less than one volt. Therefore, when the comparator output 58 is low, rather than being at common, it is at a fraction of a volt. This output 58 is the non-inverting input of the comparator 55. The inverting input of the comparator 55 is connected to the sensor voltage signal input 26 of the comparator 24. So long as the sensor 19 is operating normally, this voltage is substantially higher than the fraction of a volt applied to the non-inverting input of the comparator 55, and therefore, the output 59 of the comparator 55 remains low. In the event that the sensor 19 should become shorted, the voltage at the inverting input of the comparator 55 falls below a fraction of a volt, and the comparator output 59 goes high. This results in turning on the shunting transistor 50 and also energizing the photodiode 63 and circuit breaker 64, as in the case of an over-temperature condition. The comparator 53 in the illustrated circuit is one section of a quad operational amplifier, Motorola type LM324. Conveniently, the other three amplifiers 24, 32 and 55 comprise the other three sections of the quad operational amplifier circuit.

In one particular construction of the temperature control circuit 12, the comparator 32 is one-fourth of the above identifed quad operational amplifier. The feedback capacitor 38 is 0.1 microfarads, the feedback resistor 37 is 470K ohms, and the resistor 34 is 22K ohms. The potentiometer 36 is 10K ohms and the voltage V1 is a regulated 5 volts. The a-c voltage input is 12 volts peak and the a-c coupling resistor 39 is 10M ohms. The supply voltage for the comparator 32 is 12 volts and the sensed temperature signal input 11 ranges between 0.25 volts and 4.75 volts, representing a temperature range between 150° F. and 450° F.

In certain cases it has been found advantageous to add a lag compensation network to the feedback circuit of the sensed temperature amplifier 24. In cases where the area being heated contains a large thermal mass, and the sensing of temperature change lags heating by the heater, this type of circuit is more necessary. In the described hot melt adhesive hose heating system, the thermal mass is insufficient to require lag compensation. In the case of heating hot melt adhesive in a hot melt adhesive tank, the heater typically is located at the bottom of the tank and the sensor spaced apart from the heater on a side of the tank. Therefore, due to the thermal mass of the adhesive and tank, and separation of the sensor from the heater, there is a thermal lag between heating and sensing the resultant temperature change. In such a case, a compensation circuit for the thermal lag is desirable.

With reference to FIG. 3, the lag compensation modification to the feedback network of the amplifier 24 of FIG. 1 is shown. The capacitor 31 remains as before for noise suppression, but the feedback resistor 29 is divided into two halves 29' and 29", the combined value of which is the same as the value of the resistor 29 of FIG. 1. The lag compensation network is connected from the junction point between the resistors 29' and 29" to common. The lag compensation network comprises a resistor 67 connected in series with a capacitor 68, and the circuit affects the gain-phase characteristic of the amplifier so that over a certain very low frequency range, the output of the amplifier leads the input. The particular lag compensation circuit is empirically determined for each type of temperature control system since it is dependent upon thermal response characteristics, which vary.

What is claimed is:

1. In a system for controlling a parameter at a particular location, which has means operable to be activated for altering the parameter at the location, means, having an input, responsive to a control signal at the input for activating the parameter altering means, means, having an output, for sensing the parameter at the location and for producing a sensed parameter signal at the output, and a control circuit coupled to the output of the parameter sensing means and to a parameter set point signal and operable to produce an intermittent control signal, coupled to the input of the activating means, which is proportional to the difference between the two control circuit inputs, an improved control circuit comprising:

a comparator circuit having a first input coupled to the output of the parameter sensing means and second input coupled to a parameter set point signal and having an output coupled to the input of the activating means;

feedback means for conditioning the comparator circuit to produce an intermittent pulse signal at its output when its inputs are substantially equal; and means for coupling an a-c ripple voltage signal to one of the comparator inputs, said a-c ripple voltage supplied from an a-c source via a voltage attenuator such as a resistor to said one of the comparator inputs, whereby a band of values of the difference between the comparator inputs established by the amplitude of the a-c signal results in the production of an intermitten pulse signal at the output of the comparator with the pulse duration dependent upon said difference.

2. The control circuit of claim 1 in which the comparator circuit comprises an operational amplifier whose inverting input is coupled to the output of the parameter sensing means and whose non-inverting input is coupled to the parameter set point signal.

3. In a system for controlling the temperature at a particular location, which has means operable to be activated for altering the temperature at the location, means, having an input, responsive to a control signal at the input for activating the temperature altering means, means, having an output, for sensing the temperature at the location and for producing a sensed temperature signal at the output, and a control circuit coupled to the output of the temperature sensing means and to a temperature set point signal and operable to produce an intermittent control signal, coupled to the input of the activating means, which is proportional to the difference between the two control circuit inputs, an improved control circuit comprising:
- a comparator circuit having a first input coupled to the output of the temperature sensing means and a second input coupled to a temperature set point signal and having an output coupled to the input of the activating means;
- feedback means for conditioning the comparator circuit to produce an intermittent pulse signal at its output when its inputs are substantially equal; and
- means for coupling an a-c ripple voltage signal to one of the comparator inputs, said a-c ripple voltage supplied from an a-c source via a voltage attenuator such as a resistor to said one of the comparator inputs, whereby a band of values of the difference between the comparator inputs established by the amplitude of the a-c signal results in the production of an intermittent pulse signal at the output of the comparator with the pulse duration dependent upon said difference.

4. The control circuit of claim 3 in which the comparator circuit comprises an operational amplifier whose inverting input is coupled to the output of the temperature sensing means and whose non-inverting input is coupled to the temperature set point signal.

5. The control circuit of either of claims 2 or 4 in which the feedback means comprises a resistance and a capacitance in series connection coupled between the output of the operational amplifier and its non-inverting input.

6. A system for controlling the temperature at a particular location comprising:
- means operable to be activated for altering the temperature at the location;
- means, having an input, for activating the temperature altering means in response to a control signal at the input;
- means, having an output, for sensing the temperature at the location and for producing a sensed temperature signal at the output;
- a comparator circuit having a first input coupled to the output of the temperature sensing means and a second input coupled to a temperature set point signal and having an output coupled to the input of the activating means;
- feedback means for conditioning the comparator circuit to produce an intermittent pulse signal at its output when the signals at the comparator inputs are substantially equal; and
- means for coupling an a-c ripple voltage signal to one of the comparator circuit inputs, said a-c ripple voltage supplied from an a-c source via a voltage attenuator such as a resistor to said one of the comparator inputs, whereby a band of values of the difference between the comparator inputs established by the amplitude of the a-c signal results in the production of an intermittent pulse signal at the output of the comparator with the pulse duration dependent upon said difference.

7. The system of claim 6 which further comprises protection means for comparing the sensed temperature signal to a high temperature reference signal, which corresponds to a temperature higher than that of the temperature set point signal, and for producing an over-temperature control signal at an output if the sensed temperature signal becomes equal to the high temperature reference signal.

8. The system of claim 7 in which the temperature sensing means comprises a bridge circuit having a first leg which includes a temperature dependent resistance and a second leg, and a differential amplifier whose inverting input is coupled to the second leg of the bridge and whose non-inverting input is coupled to the first leg of the bridge and whose output is the output of the temperature sensing means.

9. The system of claim 8 in which the protection means has an input coupled to the non-inverting input of the differential amplifier of the temperature sensing means, the protection means including means for comparing said input to a reference value and for producing the over-temperature control signal at its output if the signal at said input falls to the level of said reference value.

10. The system of claim 9 which further includes means, coupled to the output of the protection means, for decoupling the output of the comparator circuit from the input of the activating means when an over-temperature control signal is produced by the protection means.

11. The system of claim 10 in which the temperature altering means comprises a heating element connected in series with a source of a-c power, and further comprising means responsive to an over-temperature control signal at the output of the protection means to disconnect the a-c power source from the heating element.

12. The system of claim 6 in which the temperature sensing means comprises a bridge circuit having a first leg which includes a temperature dependent resistance and a second leg, and a differential amplifier whose inverting input is coupled to the second leg of the bridge and whose non-inverting input is coupled to the first leg of the bridge and whose output is the output of the temperature sensing means.

13. The system of either of claims 11 or 12 in which the differential amplifier of the temperature sensing means includes a feedback circuit having a resistive feedback path from its output to its inverting input and having a lag compensation circuit comprising a resistance in series with a capacitance coupled between the feedback path and a circuit common point for the differential amplifier.

14. The system of claim 6, wherein said means for sensing the temperature at a location and for producing a sensed temperature signal at an output further comprises means for linearizing said sensed temperature signal such that said comparator circuit receives a substantially linear signal at said first input.

15. The system of claim 14, wherein said temperature sensing means comprises a bridge circuit having a first leg and a second leg, said first leg including a temperature sensitive resistance, and a differential amplifier whose inverting input is coupled to the second leg of said bridge circuit and whose non-inverting input is coupled to said first leg of said bridge circuit, said first leg further comprising a resistor in series with said temperature dependent resistance, such that said temperature sensitive resistance and said resistor are each coupled to said non-inverting input, the value of said resistor being such that the output of said differential amplifier is of a linear nature.

16. The system of Claim 15, wherein said temperature sensitive resistance has a resistive characteristic of 191 ohms at 90° C. and 259 ohms at 160° C. and 327 ohms at 220° C. and said resistor has a resistance of 576 ohms.

* * * * *

UNITED STATES PATENT AND TRADEMARK OFFICE
CERTIFICATE OF CORRECTION

PATENT NO. : 4,467,182
DATED : August 21, 1984
INVENTOR(S) : Stephen Lee Merkel

It is certified that error appears in the above-identified patent and that said Letters Patent is hereby corrected as shown below:

Column 8, line 61, "intermitten" should be --intermittent--.

Signed and Sealed this

Fifth Day of March 1985

[SEAL]

Attest:

DONALD J. QUIGG

Attesting Officer     Acting Commissioner of Patents and Trademarks